April 14, 1942. S. FREEMAN Re. 22,067

HAIR CURLING DEVICE AND METHOD OF CURLING HAIR

Original Filed Oct. 19, 1935

INVENTOR
Samuel Freeman
BY Mock & Blum
ATTORNEYS

Reissued Apr. 14, 1942 Re. 22,067

UNITED STATES PATENT OFFICE 22,067

HAIR CURLING DEVICE AND METHOD OF CURLING HAIR

Samuel Freeman, New York, N. Y., assignor to William Finkelstein, New York, N. Y.

Original No. 2,039,789, dated May 5, 1936, Serial No. 45,754, October 19, 1935. Application for reissue September 8, 1936, Serial No. 99,884

11 Claims. (Cl. 132—33)

My invention relates to a new and improved hair curling device and to a new and improved method of curling the hair.

One of the objects of my invention is to provide an improved device and method for curling a lock of hair, so that the curler pin remains in engagement with the spirally wound lock of hair, when the holder for said pin is removed.

Another object of my invention is to provide an improved hair curling device, comprising a novel combination of a hair curling pin and a holder therefor.

Other objects of my invention will be set forth in the following description and drawing which illustrate preferred embodiments thereof, it being understood that the above statement of the objects of my invention is intended to generally explain the same without limiting it in any manner.

Figure 1:
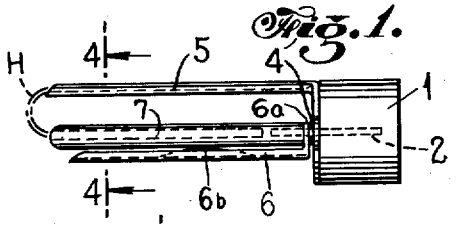
Fig. 1 is a side elevation showing the holder of the improved device, the hair pin being indicated in dot and dash lines.
Figure 2:
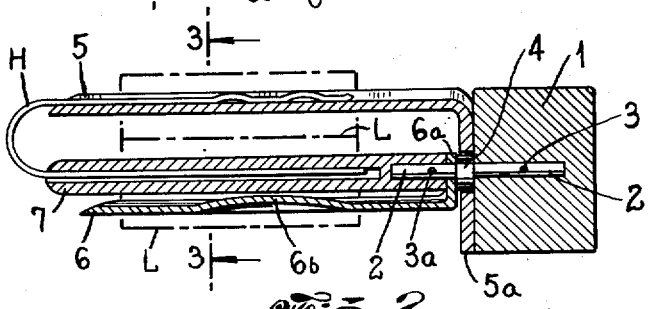
Fig. 2 is a vertical sectional view of the device shown in Fig. 1, the hair curling pin being shown in elevation.
Figure 4:
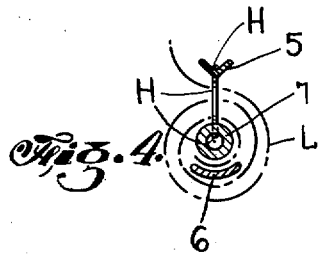
Figure 3:
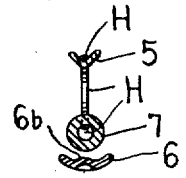

Figs. 3 and 4 are respectively sectional views on the line 3—3 of Fig. 2 and on the line 4—4 of Fig. 1.

Figure 5:
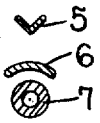

Fig. 5 is a transverse sectional view showing the two shanks of the holder in a position different from the position shown in Fig. 3.

Figure 6:
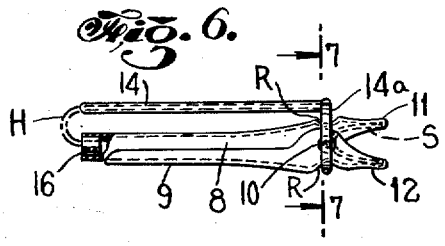

Fig. 6 shows the hair pin embodied in connection with a curler of a different construction.

Figure 7:
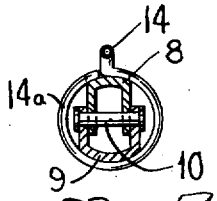

Fig. 7 is a sectional view on the line 7—7 of Fig. 6.

Figure 8:
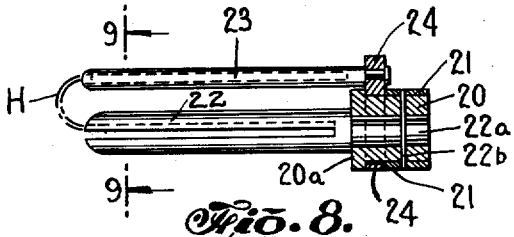

Fig. 8 shows a combination of the hair pin with a different type of holder. This is an elevation partially in section.

Figure 9:
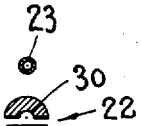

Fig. 9 is a sectional view on the line 9—9 of Fig. 8.

It has heretofore been well known to curl a lock of hair into spiral form by means of various devices. After the lock of hair was moistened, it was then wound upon the curling device, and the curling device was removed from the lock of hair after the lock of hair had dried. In many cases it was necessary to hold the lock of hair in its curled shape, by means of a hair pin, after the hair curling device had been removed. This was inconvenient, and the object of the invention is to combine a holder of an improved type with a hair pin, so that the hair pin, or a shank thereof, can be applied to the lock of hair during the curling operation, and the hair pin remains in engagement with the lock of hair, after the holding device has been removed from the lock of hair.

Figs. 1 and 2 illustrate the preferred form of holder having a handle or finger-hold 1, which can be made from wood, metal or any other suitable material.

A pin 2, made of metal or any other suitable material and having an enlargement 4, is partially located in a recess of the handle 1. The pin 2 can be fixed to the handle 1 in any suitable manner, as for example, by means of a pin 3. The holder also comprises a first shank member 5 having a concavo-convex cross-section.

I do not wish to be limited to any shape of the first shank member 5. For example, said shank member 5 may have a tubular cross section or it may have any desired hollow shape. The first shank member 5 is provided with an extension 5*a*, which fits turnably upon the enlargement 4.

A second shank member 6, which may have a concavo-convex cross-section or any other desired shape, is provided with an extension 6*a* which is fixed to the pin 2, so that the second shank member 6 is non-turnable relative to the handle 1. Hence, when the handle 1 is turned, the second shank member 6 turns in unison with the handle 1.

A tube 7, made of metal or any other suitable material, is rigidly connected to the pin 2. This may be done by means of a transverse pin 3*a*. Instead of using transverse pins 3 and 3*a* the parts may be connected by a drive fit or the like. The member 6*a* is clamped between the enlargement 4 and the tube 7.

It will be noted that the tube 7 is recessed at its outer and inner ends, thus leaving an intermediate solid portion. However, the tube 7 may be provided with a continuous bore.

It is to be understood that whenever I refer to a tube, I wish to include a hollow member of any desired shape or cross section.

For convenience, the end of the member 1 which is adjacent the handle 1, may be designated as the inner end of said member.

A hair pin H, made of springy metal or any other suitable material, can be held in the outer ends of the tube 7, and in the turnable shank 5.

As shown in Fig. 2, the rigid shank member 6 may be provided with an offset portion 6*b*, so that the end of the lock of hair can be resiliently clamped between said offset extension 5*b* and the surface of the member 7.

In using this device, the hair pin H is assembled with the holder, as shown in Fig. 2.

If desired, the shanks of the hair pin can be inserted into the holder, after the hair has been wound into curl form. The end of the lock of hair is clamped between the extension 6b and the member 7. The operator then holds the shank member 5 in one hand and turns the handle 1 with the other hand. The members 7 and 6 turn in unison with the handle 1.

However, since the member 6 is laterally offset relative to the member 7, the turning of the handle 1 causes the member 6 to turn around the axis of the member 7, which may coincide with or be offset relative to the central axis of the handle 1.

The position of the parts in Fig. 3 corresponds to the position of the parts in Fig. 2.

Fig. 5 shows how the member 6 has been turned relative to the member 5 and around the central axis of the member 7, so that the member 6 is now intermediate the members 5 and 7.

Since the hair pin H is made of resilient material, it clamps against the members 5 and 7 while the device is being turned. The hair pin does not turn while the handle is turned.

Fig. 4 illustrates how the lock of hair L has been spirally wound around the members 6 and 7, and without winding it around the member 5. When the winding operation has been completed, the end of the lock of hair is free from the member 5.

After the operation illustrated in Fig. 4 has been completed, the handle 1 is moved longitudinally, thus withdrawing the parts connected thereto from the lock of hair, and leaving said lock of hair engaged between the resilient shanks of the hair pin H. This can be done by holding the hair pin H in one hand, while the handle 1 is moved longitudinally with the other hand. The shanks of the hair pin move towards each other to engage the lock of hair when said shanks are released from the members 5 and 7.

Likewise the operator can hold the lock of hair in one hand and pull the handle 1 with the other hand so that the hair pin H is disengaged from the members 5 and 7, leaving the hair pin H in operative position.

Fig. 6 illustrates a holder which is different from that illustrated in Figs. 1 and 2. The modified holder comprises a hollow body 8, which may be of tubular or other shape, and which may be provided with one or more longitudinal rows of perforations. A clamp 9 is pivotally connected to the body 8, by means of a pivot pin 10, and the body 8 and the clamp 9 are provided with fingerhold extensions 11 and 12. A spring S holds the member 9 in clamping engagement with the body.

By pressing upon the members 11 and 12, the clamp 9 can be turned away from the body 8.

The device has a hollow or recessed extension 14, which is turnable relative to the body 8 and the clamp 9. For example and as shown in Fig. 7, the hollow member 14 can be provided with an eye extension 14a, in which the connected members 8 and 9 are turnably mounted. The members 8 and 9 may be provided with recesses R in which the eye member 14a fits, so as to provide said turnable extension.

The parts may be assembled by pressing the members 11 and 12 towards each other as far as possible, then slipping the eye member 14a into position, and then releasing the members 11 and 12.

In the ordinary use of the device, the members 11 and 12 will not be pressed towards each other to an extent sufficient to permit the release of the members 8 and 9 from the eye 14a. In this embodiment a hollow plug 16 may be frictionally and removably located in the outer end of the tubular body 8.

The hair pin H fits frictionally within the members 14, 16 and 8.

In order to use this device, the end of the lock of hair is clamped between the members 8 and 9, and the members 8 and 9 are then turned relative to the member 14, while the hair pin H is in the position illustrated in Fig. 6. After the lock of hair has been curled, the associated members 8, 9 and 14 can be longitudinally removed from the lock of hair, so that the hair pin H remains in operative position, to hold the lock of hair in its spirally wound form.

The holder illustrated in Figs. 8 and 9 is provided with a handle 20, having a sleeve 21 rigidly connected thereto by means of a pin 22b, a drive fit or the like.

A bifurcated member 22 is provided with a shank which enters a suitable bore in the member 20, and the pin 22b rigidly connects said shank 22a, to the member 20.

A supplemental hollow member 23 is rigidly connected to a sleeve 24 which is turnable relative to the member 20. The member 20 is provided with a shoulder 20a, and the shoulder 20a and sleeve 21 prevent any longitudinal movement of sleeve 24, while permitting the members 24 and 20 to turn freely relative to each other. In this embodiment, the end of the lock of hair is inserted between the two halves of the member 22.

If desired, spring or other retaining means may be provided for clamping the end of the lock of hair to the member 22, but this is not necessary.

As shown in Fig. 9, one of the parts of the member 22 is provided with a longitudinal groove 30 for receiving the corresponding shank of the hair pin H. The handle 20 is turned so as to wind the lock of hair into spiral form while the member 23 and the hair pin H are held against turning.

After the lock of hair has been wound into spiral form, the parts are withdrawn save for the hair pin H, which remains in operative position to resiliently clamp the lock of hair and retain it in its curled form.

It will be noted that the hair pin H has two shanks, as is customary.

When the device is operated, the lock of hair is wound spirally around or relative to the longitudinal axis of one of said shanks of the hair pin, and out of contact with said shank of the hair pin. When the holding device is removed, the lock of hair remains spirally wound around one of said shanks and the other shank of the hair pin H resiliently clamps the outer turn of the spiral.

Whenever I refer to engaging the end of the lock of hair, or to engaging one or both shanks of the hair pin, I do not wish to be limited to any particular form of clamping device, and I can omit the use of a positive clamping device.

For example, the member 22 shown in Fig. 8 loosely engages the end of a lock of hair to an extent sufficient for the purposes of the invention, even though the end of the lock of hair is not positively clamped in position.

I have illustrated different embodiments or types of holders in order to show the various ways of utilizing the invention, and it is clear that numerous changes and omissions can be made without departing from its spirit.

I claim:

1. In combination, a hair pin having a pair of shanks and a holder having two members shaped to hold said hair pin with its shanks separated from each other, said holder being longitudinally separable from said hair pin, one of the members of the holder being turnable relative to the hair pin and relative to the other member.

2. In combination, a hair pin and a holder, said holder comprising two spaced members which are turnable relative to each other, said holder having a portion thereof shaped to hold the shanks of the hair pin separated from each other.

3. In combination, a hair pin and a holder, said holder having first means for engaging the end of a lock of hair and one shank of the hair pin, said holder having second means for engaging the second shank of the hair pin, the second means and the first means being laterally spaced from each other and being turnable relative to each other.

4. A hair curling device comprising a first member around which the hair can be spirally wound, said device also having a second member, said members being shaped so as to hold a hair pin, said members being laterally offset, the first member being turnable relative to the second member so that the hair can be wound spirally around the first member, while the second member and the hair pin are held stationary.

5. A hair curling device comprising a first member around which a lock of hair can be wound spirally, a handle connected to said first member, a second member, said members being shaped so as to hold a pair pin, the handle and the first member being turnable relative to the second member.

6. A method of curling a lock of hair, which consists in first connecting a hair pin detachably to turnable hair-curling means, then operating said curling means so as to spirally wind said lock of hair while said hair pin is held on said hair-curling means in fixed longitudinal relation to said curl of hair and without turning, and then removing said curl and said hair pin from said hair-curling means while clamping said curl of hair between the shanks of the hair pin.

7. In combination, a hair pin having a pair of shanks and a holder for said hair pin, said holder having a portion thereof shaped to hold said hair pin with its shanks separated from each other, said hair pin being longitudinally separable from said holder, said holder including a turnable member which is turnable relative to said portion and which has means to clamp the end of a lock of hair thereto, so that the turning of said member around its axis forms a spirally wound curl on said turnable member, said portion being shaped to hold the hair pin with the loop portion thereof spaced outwardly from said turnable member.

8. A method of curling a lock of hair with the use of a hair pin having a pair of shanks and with the use of a holder for said hair pin, said holder having a turnable member to which the free end of a lock of hair can be clamped, said method including the following steps:—first, mounting the hair pin on the holder with its shanks separated from each other; secondly, winding a lock of hair in hollow form upon a surface of said turnable member while keeping the hair pin mounted on the holder with its shanks separated, said shanks being held sufficiently separated from each other during said winding operation and at the completion of said winding operation, so that the hollow lock of hair can be moved easily on the holder while one shank of the hair pin is located within the hollow curl and the other shank is external thereto, and thirdly, removing the hair pin and the hollow curl from the holder while the hair pin and the curl have said relative positions, and fourthly, causing the shanks of the hair pin to clamp the hollow curl against unwinding.

9. A device for curling a lock of hair comprising a hair pin having two shanks, a holder shaped to hold said hair pin with its shanks separated, said holder having a turnable member having means adapted to hold the end of a lock of hair thereto so that a lock of hair can be wound into hollow formation by connecting the end of the lock of hair to said turnable member and then turning said turnable member, said holder being shaped so that the hair pin has its shanks sufficiently separated when said hair pin is mounted on said holder to permit easy movement of the lock of hair on the holder when the hollow lock of hair has one of the shanks of the hair pin located inwardly thereof and the other shank located externally thereto, so that when the hair pin and the lock of hair are removed wholly from the holder, the shanks of the hair pin can be moved towards each other to hold the lock of hair against unwinding.

10. A device for curling a lock of hair and clamping the curl between the shanks of a hair pin, comprising a holder having spaced portions for engaging the shanks of a hair pin to hold the shanks apart in open position, one of said parts providing a roll for curling a lock of hair thereon, said roll part of the holder being substantially coaxial with the shank of the hair pin when mounted on the holder, whereby the formed curl may be slid from the roll part of the holder onto the adjacent shank of the hair pin with the said shank within the curl and whereby the hair pin may be released from the holder for closing the pin with one shank within and the other shank outside of the curl to clamp the hair pin thereon.

11. A method of curling a lock of hair, which consists in first connecting a hair pin which has a pair of shanks joined to each other at a closed end of said hair pin, detachably to turnable hair-curling means at an end of said hair-curling means so that the closed end of said hair pin extends longitudinally beyond the adjacent end of said hair-curling means and the shanks of the hair pin are spaced from each other, then operating said hair-curling means so as to spirally wind said lock of hair on said hair-curling means to form a curl while said hair pin is held on said hair-curling means in fixed longitudinal relation to said curl of hair and without turning, and then removing said curl and said hair pin from said hair-curling means while clamping said curl of hair between the shanks of said hair pin and inwardly of the free ends of said shanks.

SAMUEL FREEMAN.